2,905,574
Patented Sept. 22, 1959

2,905,574
METHOD FOR FORMING METAL SULFIDE COATINGS

Günter Spengler and Hannsheinz Hohn, Munich, Germany, assignors to The Alpha Molykote Corporation, Stamford, Conn.

No Drawing. Application January 4, 1956
Serial No. 557,419

14 Claims. (Cl. 117—65)

The present invention relates to a novel method for forming a firmly adherent metal sulfide coating on a surface.

It is known that the natural disulfides of such sexivalent metals as molybdenum and tungsten, have a crystalline structure that gives them excellent lubricating properties. Inasmuch as they are solids, and therefore not subject to viscosity changes, these sulfides are valuable as lubricants, particularly where high pressures, high temperatures, or both, are encountered. In addition, they are valuable in preventing corrosion and abrasion of metal surfaces on which they are coated. It is also known that these sulfides are valuable as catalysts in many types of reactions, especially in hydrogenation and dehydrogenation. Furthermore, they possess interesting electrical properties which have led to their use in rectifiers and the like.

The use of natural sulfides, e.g., molybdenite and tungstenite, in the preparation of coatings has the disadvantages of requiring extensive purification and comminution to a suitably fine particle size. Furthermore, the particles must be applied to the desired surface with a firmly adherent and continuous film of binding material. Purification is a necessary step, particularly for lubrication, in order to remove undesirable abrasive particles. Comminution into fine particle sizes requires care in order to avoid oxidation and thus, in effect, a reintroduction of impurities. The use of binding materials is inherently undesirable because the binder contributes nothing to, and in fact detracts from, the lubricity or catalytic activity of the particles but is considered necessary to provide a bond between the particles and the surface.

Methods of application, such as for example, spraying the surface with a suspension of sulfide in a readily volatile vehicle, or immersing the surface in a suspension containing the sulfide and a binder, followed by baking on the film produced by such spraying or immersion have serious disadvantages. These disadvantages are particularly pronounced when an attempt is made to form a uniform and continuous coating on an inaccessible surface such as the inner surfaces of a porous body.

In accordance with the present invention, firmly adherent and continuous coatings of metal sulfides are obtainable in crystalline form at relatively low temperature on surfaces of substantially any type. This is accomplished essentially by thermally decomposing, in situ, a compound of the general formula $R_2MS_4$ in which the R's stand for $NH_4$ or organic ammonium radicals, the free bases of which are volatile below 300° C. at atmospheric pressure, and in which M stands for molybdenum or tungsten.

In the preferred embodiment of the invention, a true solution of a thiomolybdate or thiotungstate of a volatile base is formed, the surface to be coated is treated with the solution, and then heat is applied to the treated surface for evaporating the solvent and thermally decomposing the solute to the desired sulfide.

The compound that is dissolved in the solution and thermally decomposed, in situ, to the metal sulfide is preferably ammonium tetrathiomolybdate or the corresponding tungstate. Organic tetrathiomolybdates and tetrathiotungstates whose organic nitrogen bases are volatile at temperatures below about 300° C. are also eminently suitable. Such tetrathiomolybdates and tungstates may, for example, be prepared by introducing hydrogen sulfide into a solution of molybdic or tungstic acid in the presence of an excess of base such as monomethylamine, dimethylamine, trimethylamine, the various ethylamines, morpholine, piperazine, diethylenetriamine, octylamine, or other completely volatile organic nitrogen bases, in a suitable solvent such as water or a lower alcohol. They may also be obtained by double decomposition of water-soluble thiomolybdates or tungstates with water-soluble salts of the bases, e.g., their hydrochlorides. The tetrathiomolybdates and tungstates prepared in this manner are soluble either in water or, depending upon the size of the organic radicals, in lower alcohols, glycols, amines, aminoalcohols, ethers, polyoxyethylene compounds, and the like. In accordance with one preferred embodiment, a small amount of the base corresponding to, or similar to, the tetrathiomolybdate or tungstate is added to the solvent to increase the solubility of the solute and improve the stability of the solution. It is also an advantage to add to the solution a small amount of a volatile wetting agent in order to promote optimum wetting of the surface to be coated with the sulfide.

The surface to be coated may, if desired, be pretreated chemically, e.g., by etching, or mechanically, e.g., by sand blasting, in order to increase the actual surface area and thereby increase the concentration of metal sulfide formed on the surface. The solution can be applied to the surface to be coated in any suitable manner as by spraying, dipping, brushing, or the like. For optimum penetration into the most minute surface crevices and into the smallest pores or interstices of porous bodies, it is preferable to apply the solution to the surface to be coated in a saturated and warm state in order to achieve maximum concentration of the solute and minimum viscosity of the solution. It is also helpful to subject the surface to be treated to a vacuum in order to evacuate the crevices and interstices before applying the solution. A similar effect is obtainable by subjecting the surface to ultrasonic vibration as well as by reducing the surface tension of the solution through the addition thereto of wetting agents. After the surface has been treated with the solution, it is heated to evaporate the solvent and thermally decompose the solute to the desired metal sulfide.

The heating step may be carried out in one, two or three stages. If carried out in three stages, the stages will successively involve evaporation of the solvent, decomposition of the solute to the corresponding crystalline metal trisulfide, and conversion of the trisulfide to the disulfide. The first stage is carried out at a temperature somewhat in excess of the boiling point of the solvent. The second stage involves splitting off the volatile base and hydrogen sulfide at temperatures below about 350° C. and preferably between about 250 and 300° C. at atmospheric pressure. The final stage involves temperatures above 430° C. and preferably between about 450 and 480° C. if carried out at atmospheric pressure and somewhat lower temperatures, e.g., as low as 340° C. at 1 mm. Hg, if carried out at subatmospheric pressure. Generally, the temperature in the final stage for obtaining a disulfide coating should be at least equal to the temperature at which the vapor pressure of sulfur corresponds to the prevailing pressure conditions. It is to be understood, of course, that if the heating is carried on in a single stage, the higher temperature will finally be employed and, if carried out in two stages, the first and second or second and third stages of the three-stage treatment will, in effect, be combined unless the trisulfide is desired. For maximum yield of crystalline sulfide, minimum chemical side reactions and minimum interference with crystal formation, it is preferred to carry out the first stage at a temperature sufficiently in excess of the boiling point of the solvent to bring the solute to a substantially anhydrous state before further elevating the temperature to bring about a decomposition to the corresponding trisulfide or disulfide.

The method of the invention has a number of important advantages. Perhaps the most important of these is that the initial compound from which the metal sulfide is derived by thermal decomposition is applied to the surface in the form of a true solution and that as a result even the most minute crevices of the surface as well as the pores of a porous material are accessible to the solution. Another important advantage is that there is no necessity for employing a lacquer or other binder to obtain adhesion of the metal sulfide particles to the surface. Still another advantage is that the necessity for purification and extensive grinding of natural sulfides is completely avoided and that oxidation of such sulfides, either during the grinding stage or in a subsequent baking or sintering stage, is also avoided.

These and other advantages, as well as the utility of the invention, will become further apparent from the detailed description in the following examples illustrating the best modes now contemplated of carrying out the invention.

*Example 1*

A sintered iron bearing containing no $MoS_2$ was impregnated, after the sintering process, with a hot, saturated solution of ammoniumtetrathiomolybdate $(NH_4)_2MoS_4$ in ethyl alcohol containing monoethanolamine by subjecting the sintered bearing to a vacuum, placing it in the hot solution, and repeating this procedure twice. The sintered bearing was then heated in a dry cabinet to 110° C. and thereupon placed in a closed crucible and heated under nitrogen atmosphere for 1½ hours at 450° C.

It was found that the weight of the bearing had been increased by about 2½%. A microsection of the treated bearing showed that a uniform and firmly adherent coating of crystalline molybdenum disulfide had been produced on all surfaces. By comparison, it was found that in a sintered bearing prepared from a mixture of 97% powdered iron and 3% molybdenite, substantially the entire amount of $MoS_2$ added had been decomposed in the sintering and that only traces of molybdenum could be found in the structure.

*Example 2*

A furnace chain heated to a temperature of 350° C. was passed through a covered water bath containing 2% ammoniumtetrathiotungstate $(NH_4)_2WS_4$, ½% triethanolamine and 2½% polyglycol having an average molecular weight of 1000.

It was found that after leaving the bath, and evaporation of the polyglycol, the chains were coated with a thin lubricative coating of $WS_2$ and that this film retained its lubricity at elevated temperatures at least as high as 400° C.

*Example 3*

Pumice stone pellets, such as are customarily used as catalyst carriers and in which the "inner" surfaces are to be coated as completely as possible with catalyst, were placed in a hot, saturated, aqueous ammoniacal solution of monomethylammonium tetrathiomolybdate at a temperature of 85° C. The solution and pumice stone pellets were placed in a closed glass vessel under vacuum until generation of gas from the pumice stone pellets ceased and they had dropped to the bottom. The pumice stone pellets were then allowed to drain on a coarse, fritted glass and dried by infrared radiation. The entire process of treatment with the solution and subsequent draining an drying was then repeated. Thereupon, the dry pellets were heated for one hour in an open porcelain dish with occasional stirring under a hood at a temperature of 300° C. It was found that at the end of this time the pellets were coated with $MoS_3$. A portion of the pellets were then heated to 440° C. for another hour under a nitrogen atmosphere at 720 mm. Hg. It was found that these pellets were coated with crystalline $MoS_2$.

The $MoS_2$ and $MoS_3$ coated pellets thus obtained are useful as hydrogenation and dehydrogenation catalysts whether used individually or in admixture with one another.

*Example 4*

Asbestos fibers were impregnated with a solution of ammoniumtetrathiomolybdate in water having an ammonia content of 1% and containing in addition 0.25% wetting agent of the ammoniumalkylsulfonate type. The impregnated fibers were then heated in a drying cabinet to 110° C. and thereupon further heated under a nitrogen atmosphere for 1½ hours at 450° C.

Stuffing box packings made from the asbestos fibers so treated are self-lubricating for the life of the fibers even at elevated temperatures.

This example illustrates a most remarkable improvement over conventional asbestos fiber stuffing box packings which, if not treated with graphite or molybdenum disulfide, become useless after a short period of operation at elevated temperature because of their inability to lubricate the moving parts. It also represents a distinct improvement over asbestos packings treated with graphite or molybdenum disulfide. Known methods of graphitizing or impregnating asbestos packings with $MoS_2$ are very cumbersome and the handling of such packings is unpleasant because of the tendency of the graphite or $MoS_2$ particles to soil everything with which they come into contact.

*Example 5*

The sliding surfaces of a stoneware sulfuric acid pump were treated with a hot (85° C.), saturated aqueous ammoniacal solution of monomethylammonium tetrathiomolybdate and then heated to 480° C. in a stream of nitrogen. A firmly adhering film of $MoS_2$ was formed on the treated surfaces. The film was found to be self-lubricating and resistant to the action of sulfuric acid.

It is to be expected that various modifications will readily become apparent to those skilled in the art upon reading this description. All such modifications are intended to be included within the scope of the invention as defined in the appended claims.

We claim:
1. Method for forming a firmly adherent metal sulfide coating on a surface which comprises thermally decomposing, in situ, a compound of the general formula

$$R_2MS_4$$

in which the R stands for a member selected from the group consisting of $NH_4$ and organic ammonium radicals, the free bases of which are volatile below 300° C. at atmospheric pressure, and in which M stands for a metal selected from the group consisting of molybdenum and tungsten.

2. Method for forming a firmly adherent metal sulfide coating on a surface which comprises treating the surface with a solution of a compound of the general formula $$R_2MS_4$$

in which the R stands for a member selected from the group consisting of $NH_4$ and organic ammonium radicals, the free bases of which are volatile below 300° C. at atmospheric pressure, and in which M stands for a metal selected from the group consisting of molybdenum and tungsten, and thereupon heating the treated surface for evaporating the solvent and thermally decomposing said compound to a corresponding sulfide.

3. Method defined in claim 2 in which the heating step is carried out in two stages, the first to evaporate the solvent and the second to decompose the metal compound to a corresponding sulfide.

4. Method defined in claim 2 in which the heating step is carried out in two stages, the first to evaporate the solvent and the second to decompose the metal compound to the corresponding disulfide.

5. Method defined in claim 2 in which the heating step is carried out in two stages, the first to evaporate the solvent and the second to decompose the metal compound to the corresponding trisulfide.

6. Method defined in claim 2 in which the heating step is carried out in three stages, the first to evaporate the solvent, the second to decompose the metal compound to the corresponding trisulfide and the third to convert the trisulfide to the disulfide.

7. Method defined in claim 2 in which the heating of the treated surface is carried out in an inert atmosphere.

8. Method defined in claim 2 wherein the heating of the treated surface is carried out at a temperature at least equal to the temperature at which the vapor pressure of sulfur corresponds to the prevailing pressure conditions.

9. Method defined in claim 2 wherein the treated surface is heated to a temperature above about 440° C. at atmospheric pressure.

10. Method defined in claim 2 wherein the treated surface is heated to a temperature above about 340° C. at subatmospheric pressure.

11. Method defined in claim 2 in which the solution contains a member selected from the group consisting of ammonia and an organic ammonium base.

12. Method defined in claim 2 in which the solution contains a volatile wetting agent.

13. Method defined in claim 2 in which the solution is saturated.

14. Method defined in claim 2 in which the solution is saturated and contains a small amount of base similar to the tetrathio base.

References Cited in the file of this patent

UNITED STATES PATENTS

| | | |
|---|---|---|
| 404,463 | Bottom | June 4, 1889 |
| 869,013 | McOuat | Oct. 22, 1907 |
| 2,361,211 | Kalischer | Oct. 24, 1944 |
| 2,387,872 | Bell | Oct. 30, 1945 |
| 2,420,886 | Laffoon | May 20, 1947 |
| 2,622,993 | McCullough | Dec. 23, 1952 |
| 2,656,284 | Toulmin | Oct. 20, 1953 |
| 2,719,094 | Clough | Sept. 27, 1955 |

OTHER REFERENCES

Mellor: "Comprehensive Treatise on Inorganic and Theoretical Chemistry," vol. II, pp. 650–1 relied on.